United States Patent [19]
Spatafora et al.

[11] Patent Number: 6,109,419
[45] Date of Patent: Aug. 29, 2000

[54] DEVICE FOR CONVEYING PRODUCTS

[75] Inventors: Mario Spatafora; Fabrizio Tale', both of Bologna, Italy

[73] Assignee: Azionaria Costruzioni Macchine Automatiche A.C.M.A. S.p.A., Bologna, Italy

[21] Appl. No.: 09/128,669

[22] Filed: Aug. 4, 1998

[30]    Foreign Application Priority Data

Aug. 5, 1997 [IT]   Italy ................................ B097A0492

[51] Int. Cl.$^7$ ................................................ B65G 29/00
[52] U.S. Cl. .................... 198/377.08; 198/377.04
[58] Field of Search ................... 198/377.02, 377.03, 198/377.04, 377.06, 377.08, 377.1

[56]           References Cited

U.S. PATENT DOCUMENTS

| | | | |
|---|---|---|---|
| 4,413,709 | 11/1983 | Kazumi et al. | 198/377.02 |
| 5,151,001 | 9/1992 | Kawaguchi et al. | 198/377.08 |
| 5,188,212 | 2/1993 | Munsch . | |
| 5,749,453 | 5/1998 | Doornekamp et al. | 198/377.03 |

FOREIGN PATENT DOCUMENTS

| | | |
|---|---|---|
| 576 956 | 1/1994 | European Pat. Off. . |
| 731 022 | 9/1996 | European Pat. Off. . |
| 769 459 | 4/1997 | European Pat. Off. . |
| 623790 | 9/1978 | Russian Federation .......... 198/377.03 |
| 1264622 | 2/1972 | United Kingdom ............. 198/377.03 |
| 2063200 | 6/1981 | United Kingdom ............. 198/377.03 |

*Primary Examiner*—Robert P. Olszewski
*Assistant Examiner*—Steven B. McAllister
*Attorney, Agent, or Firm*—Pillsbury Madison & Sutro LLP

[57]            ABSTRACT

Absorbent pads passing along a feed path advance first on an infeed conveyor at a first pitch and a first velocity, then on an outfeed conveyor at a second pitch and a second velocity. The transfer from infeed to outfeed is effected by means of a head disposed between the two conveyors, rotatable about a vertical axis and carrying at least one handler unit equipped with a suction cup coupled to an epicyclic train inside the head and made to orbit around the axis following a looped trajectory; the head also comprises a cam and rocker mechanism operating in conjunction with a lever mechanism by which the suction cup is lowered and raised in a direction parallel to the axis of rotation when passing through points at which the pads are picked up from the infeed conveyor and released onto the outfeed conveyor, respectively. Being adjustable, the cam and rocker mechanism also provides means by which to vary the positions of the pickup point and the release point.

7 Claims, 4 Drawing Sheets

DEVICE FOR CONVEYING PRODUCTS

BACKGROUND OF THE INVENTION

The present invention relates to a device for conveying products.

In particular, the present invention relates to a device for conveying products of substantially elongated appearance advancing continuously and spaced equidistantly along a predetermined path. Reference is made in the following specification to a product typical of this broad description albeit no limitation in scope is implied.

Indeed whilst reference is made specifically to a device for conveying absorbent pads, as utilized in sanitary towels or napkins, the principles of the disclosure might be applied equally well to other products of substantially elongated shape, such as edible commodities.

Conventionally, such conveying devices operate on lines along which products, spaced apart initially at a first pitch P1, are caused to advance at a first velocity V1 before being spaced apart at a second pitch P2 different to the first and directed thus toward a further machine unit at a different velocity V2.

To bring about the change, such conveying devices will generally comprise an infeed and an outfeed conveyor extending along a predetermined feed path, also a transfer head disposed partly between the two conveyors, rotatable about an axis disposed orthogonally to the feed path and carrying a set of handler units furnished with respective uplifters by which the products are picked up cyclically and transferred from the one conveyor to the other in such a way that their position in space is changed during the course of the transfer. This is achieved conventionally by incorporating an epicyclic drive train into the transfer head, through the agency of which the handler units are made to advance along a substantially annular looped trajectory exhibiting rounded vertexes with a relatively short radius of curvature, and substantially rectilinear stretches interconnecting each two contiguous vertices. More exactly, two such contiguous vertices of the looped trajectory are disposed respectively above an exit end of the infeed conveyor and above the entry end of the outfeed conveyor, compassing a portion of the path along which the products are transferred and repositioned in space.

In general, the handler units are equipped with means by which the respective uplifters are driven and rotated; these consist typically in mechanical linkages containing higher pairs and mechanisms with cam profiles of which the functions, generated by uniform rotation of the transfer head, are to translate the uplifters toward and away from the feed path in such a way as to pick up and release the products, and to rotate the selfsame uplifters about the axis of translation so as to vary the position in space of the products during their transfer from one conveyor to the other, according to a predetermined law of motion.

It will be clear that whilst the angular velocity of the transfer head remains constant, the linear velocity of the handler units as they follow the looped trajectory is discontinuous. More precisely, the translational velocity of the handler units as projected along the direction of the aforementioned predetermined feed path is variable, decreasing to minimum values at the two contiguous vertices and reaching a maximum value at an intermediate point along the portion of the trajectory located above the feed path and between the same two vertices.

During operation of the device, therefore, it is important that the movements of the handler units are timed with due precision in relation to the two conveyors, in such a manner that the pickup of the single product from the infeed conveyor occurs at a point on the path situated in the neighbourhood of the first vertex of the feed trajectory and at a distance from this same vertex coinciding with a moment when the linear velocity of the handler unit is instantaneously identical or at least closely approximate to the feed velocity V1 of the infeed conveyor beneath. A similar condition applies for the release of the product, which must occur at a point on the path situated in the neighbourhood of the second vertex and at a distance from this same vertex coinciding with a moment when the linear velocity of the handler unit is instantaneously identical or at least closely approximate to the feed velocity of the outfeed conveyor, otherwise the pitch and the correct position in space will be lost.

This requirement is highlighted especially in the case of products, such as absorbent pads (sanitary towels or napkins), exhibiting a substantially rectangular geometry typified by a predominating longitudinal dimension considerably greater than the transverse; in this instance, it happens that when the single product is rotated through 90° or thereabouts, the two feed pitches P1 and P2 and the velocities V1 and V2 of the two conveyors differ one from another by relatively significant amounts. As a result, the distance of the pickup point from the first vertex will be different to the distance of the release point from the second vertex.

It will be evident from the preamble that with predetermined mechanical ratios existing between the linkages through which motion is transmitted to the transfer head carrying the handler units, and the linkages transmitting linear and angular motion to the relative uplifters, conveying devices of the conventional type in question are unable to respond as desired to variations in position of the pickup and release points with respect to the infeed and outfeed conveyors. Thus, one has a certain lack of flexibility as regards the capacity of the device to adapt swiftly to variations in the dimensions of the products and/or to variations in the operating speeds of the infeed and outfeed conveyors along the feed path, and therefore to changes in the size of the products being conveyed.

The object of the present invention is to provide a conveying device such as will allow of picking up and releasing products at desired velocities and pitches, also of adjusting the pickup and release operations in such a way that these same operations can be timed to occur at different points along a given feed path, and in general overcoming the problems outlined above with reference to the prior art.

SUMMARY OF THE INVENTION

The stated object is duly realized in a device according to the present invention for conveying products directed along a given feed path.

Such a device comprises an infeed conveyor on which the products advance in succession at a first pitch and at a first velocity; an outfeed conveyor on which the products advance at a second pitch and at a second velocity; a transfer head located in part between the two conveyors, rotatable about an axis disposed orthogonally to the feed path and carrying at least one handler unit equipped with a relative uplifter by which the products are picked up; and transmission means disposed and embodied in such a way as to advance the handler unit, when the head is set in rotation, along a looped trajectory exhibiting at least a first vertex located above the infeed conveyor, a second vertex located above the outfeed conveyor, and a branch extending above the feed path between the selfsame two vertices; also actuating means operating mechanically one in conjunction with another, disposed and embodied in such a way that when the head is set in rotation, the uplifter can be displaced along a controlled direction substantially parallel with the axis of rotation, toward and away from the feed path, and positioned thus to coincide with a point at which the products are picked up from the infeed conveyor and a point at which the products are released onto the outfeed conveyor. In the device disclosed, to advantage, the actuating means are adjustably positionable in relation one to another and to the transmission means in such a way as to allow of varying the position of the pickup point and the position of the release point to suit a given angular velocity of the transmission means.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
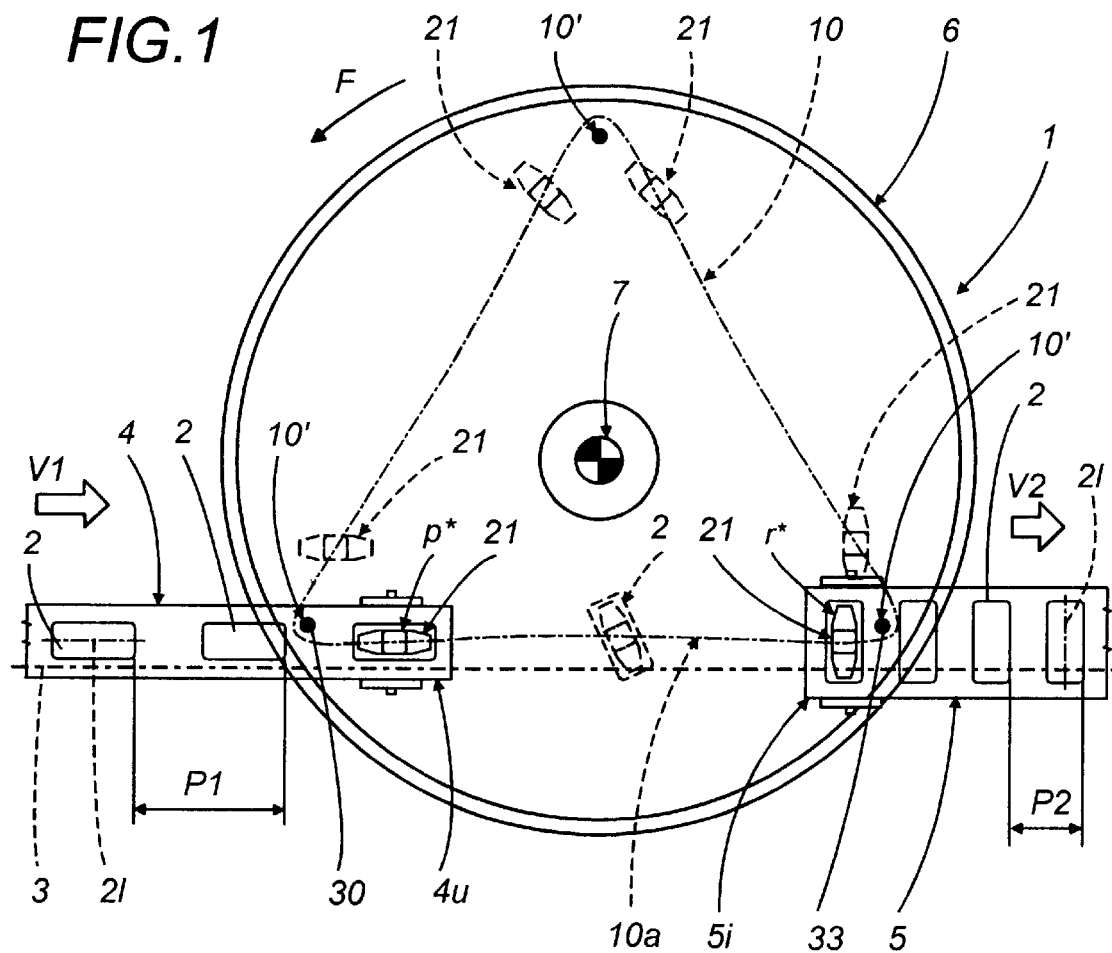
FIG. 1 illustrates a device for conveying products according to the invention, viewed schematically and in plan, and with certain parts omitted for clarity.

With reference to FIG. 1 of the drawings, 1 denotes a device, in its entirety, for conveying products 2 caused to advance continuously and equidistantly along a predetermined feed path 3 afforded by an infeed conveyor 4 and an outfeed conveyor 5, both rectilinear, which are axially aligned, arranged in succession and spaced apart one from the other.

The products 2, of which a typical example would be absorbent pads (as in sanitary towels, napkins) appearing substantially rectangular viewed in plan, are caused to advance along the infeed conveyor 4 at a first velocity V1, distanced one from the next at a first pitch P1 and occupying a first position in space with their relative longitudinal axes 2L disposed parallel to the feed path 3.

The products on the outfeed conveyor 5 are spaced apart at a second pitch P2 and caused to advance at a second velocity V2 occupying a second position in space, rotated through 90° relative to the first, hence with the respective longitudinal axes 2L disposed substantially normal to the feed path 3. As discernible from FIGS. 1 and 3, the device 1 also comprises a transfer head 6 by which the products 2 are advanced and rotated, consisting in a carousel platform 6a surmounted by and rigidly associated with a bell housing 6b.

The transfer head 6 is power driven and rotatable with respect to a fixed frame 60 about a vertical axis 7 disposed orthogonally to the feed path 3, in an anticlockwise direction denoted F. Lying in part between the infeed and outfeed conveyors 4 and 5, the head 6 carries three handler units 9 equispaced around the axis of rotation 7 and furnished with respective uplifters 21 capable of picking up the products 2 by conventional means. FIG. 1 illustrates a number of the uplifters 21, advancing around the axis 7 of rotation, of which just two are shown in bold line and the remainder in phantom line.

Figure 3:
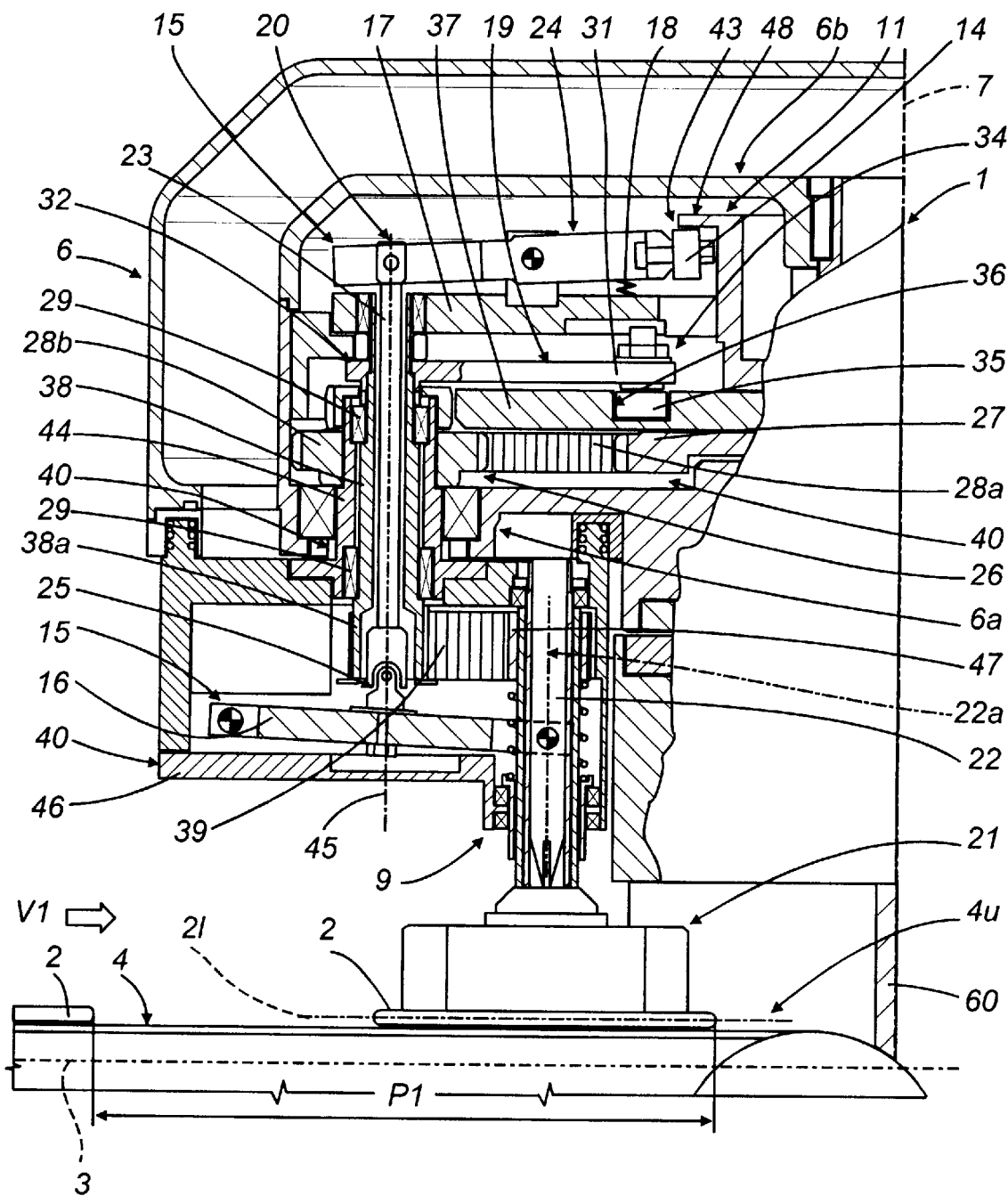
FIG. 3 illustrates a detail of FIG. 1, viewed partly in section and with parts omitted for clarity.
Figure 4:
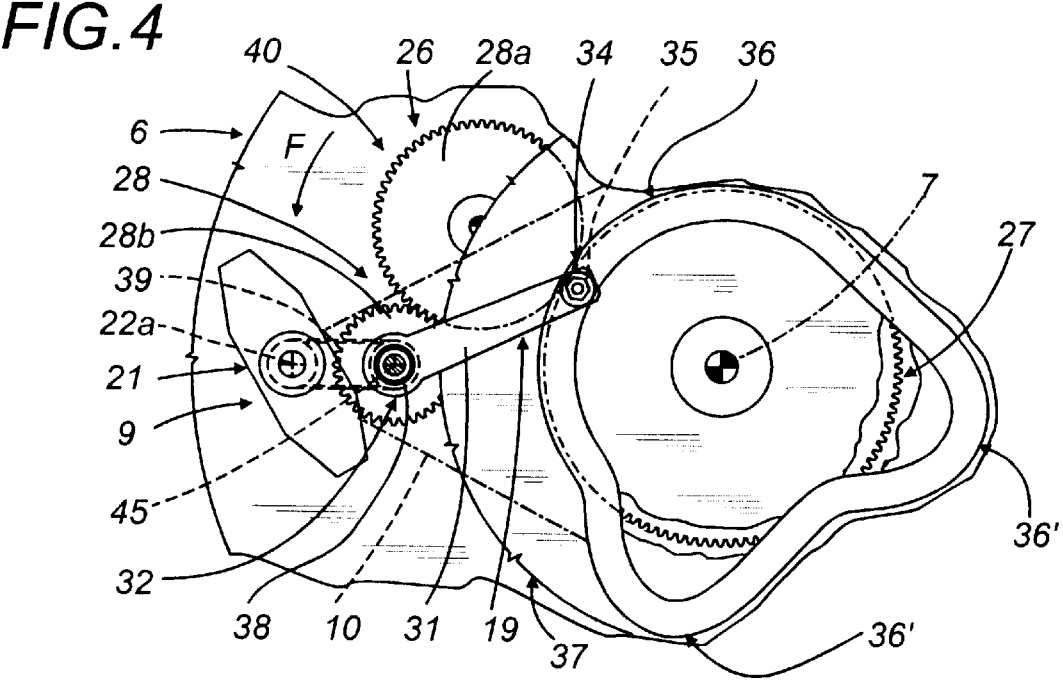
FIG. 4 illustrates a detail of FIG. 3, viewed partly in section and with parts omitted for clarity.
Figure 5A:
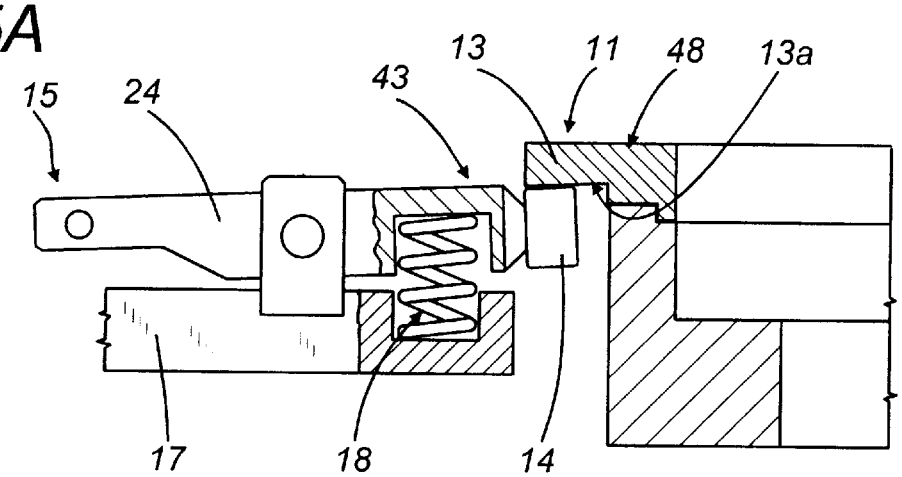
FIG. 5A and FIG. 5B illustrate a detail of FIG. 3, viewed schematically in a side elevation and in two operating conditions.
Figure 5B:
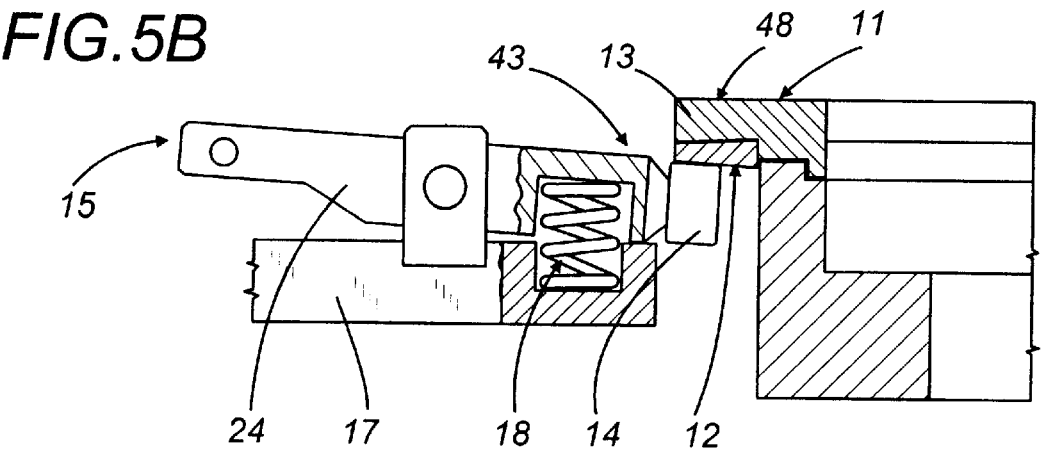

As indicated in FIGS. 3 and 4, the handler units 9 are associated mechanically with the head 6 by way of transmission means denoted 40 in their entirety, disposed and embodied in such a way that when the platform 6a is set in rotation, the handler units 9 and the relative uplifters 21 are caused to advance along a looped trajectory 10 extending around the axis 7 of rotation.

Purely for the sake of clarity, it can usefully be stated at this point that a preferred embodiment of the device 1, as illustrated in FIGS. 1 and 4, will incorporate transmission means 40 structured in such a way that the handler units 9 are caused to follow a substantially triangular trajectory 10 comprising three substantially rectilinear branches interconnected by three bends having a short radius of curvature centred on the respective vertex 10'.

As indicated in FIG. 1, two of the vertices 10', denoted 30 and 33 to facilitate identification, are located respectively above the infeed conveyor 4 and above the outfeed conveyor 5, and more exactly, the first vertex 30 above the exit end 4u of the infeed conveyor 4 and the second vertex 33 above the entry end 5i of the outfeed conveyor 5. One of the three branches of the trajectory 10, extending between the two vertices 30 and 33 in question and denoted 10a in FIG. 1, is positioned above the feed path 3 and coincides with the area by which the two conveyors 4 and 5 are substantially separated.

Referring also to FIGS. 3 and 4, the transmission means 40 comprise an epicyclic train 26 composed of a fixed sun wheel 27, rigidly associated with the frame 60 and coaxially aligned with the head 6, and a set of planet wheels 28 for each of the handler units 9. Each set of planet wheels 28 is capable of orbiting about the sun wheel 27, and comprises a first and a second planet wheel denoted 28a and 28b respectively.

44 denotes a sleeve keyed to the second planet wheel 28b and serving to support a tubular shaft 38 with an axial bore, which is carried in bearings 29 and freely rotatable about its own axis 45 relative to the sleeve 44. A hollow element 46 associated with the bottom end of the sleeve 44 forms part of the transmission means 40 and is free likewise to rotate about the selfsame axis 45 in relation to the platform 6a. One side of the hollow element 46 supports a second tubular shaft 22 with a relative axial bore, which extends parallel to the axis 7 of rotation of the head 6 and to the axis 45 of the first tubular shaft 38 and is rotatable about its own axis, denoted 22a. The second tubular shaft 22 is also axially slidable in relation to the hollow element 46 and carries a vacuum type uplifter 21 attached to its bottom end, equipped with a suction cup (not illustrated). The first tubular shaft 38 and the second tubular shaft 22 are connected by way of a flexible toothed belt element 39 looped around the bottom end 38a of the one shaft 38, and around a pulley 47 keyed slidably onto the second shaft 22.

As discernible from FIGS. 3 and 4, the device 1 also comprises orienting means denoted 19, serving to position the uplifter 21 in space, which are disposed and embodied in such a way as to allow of varying the angle of the uplifter 21 in relation to the feed path 3.

In particular, such orienting means 19 comprise an arm 31 of which one end 32 is connected rigidly to the top end of the first tubular shaft 38 and the opposite end 34 carries a roller 35 positioned to engage and follow a cam profile 36 substantially encircling the rotational axis 7 of the head 6.

The cam profile 36 is afforded by a fixed disc 37 of which the plan appears substantially symmetrical in relation to a straight line X departing from the rotational axis 7 of the head 6 and comprises three curvilinear portions 36. A first such portion 36 extends substantially equidistant from the axis 7 of rotation around its entire developable length and is connected to two lobate second portions 36' connected one to another; the second portions 36' are horizontally disposed, occupying two distinct adjoining planes into which the horizontal plane is divided by the straight line X, and their profiles separated from the axis 7 of rotation by a distance greater than that separating the first portion 36 from the axis 7.

The device also comprises actuating means 11 and 15 by which the uplifter 21 can be displaced along a predetermined direction substantially parallel to the rotational axis 7 of the head 6. The function of such means 11 and 15 is to alternate the single uplifter 21 between a lowered limit position, close to the feed path 3, and a raised limit position remote from the feed path 3.

Observing FIGS. 3, 5A, 5B, 6 and 7, the actuating means 11 and 15 will be seen to comprise a cam 48 with an adjustable profile 12 supported by a fixed annular track 13 encircling the rotational axis 7 of the head 6. The cam profile 12 thus encircles the axis 7 in similar fashion, though not entirely, as a portion 13a of the track 13 is left exposed. The combined surfaces of the cam profile 12 and the exposed portion 13a of the track 13 are followed by a roller 14 associated with the free end of a first lever 24 constituting one component of a linkage 15 that forms part of the actuating means 11, 15 and operates between the roller 14 and the uplifter 21. More exactly, the group of components comprising the cam profile 12, annular track 13, roller 14 and first lever 24 combine to create a cam and rocker mechanism denoted 43 in FIGS. 3, 5a, 5b.

Figure 6:
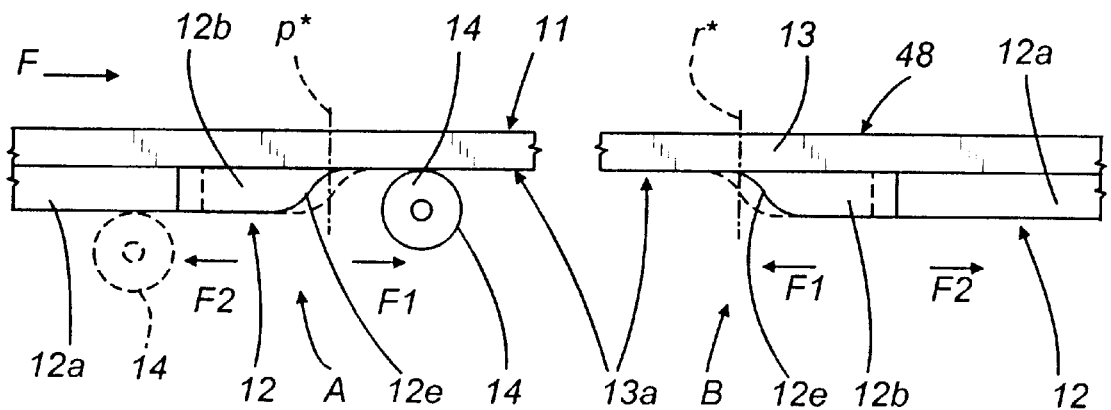
FIG. 6 illustrates a detail of FIG. 5A and FIG. 5B, viewed schematically in a side elevation.
Figure 7:
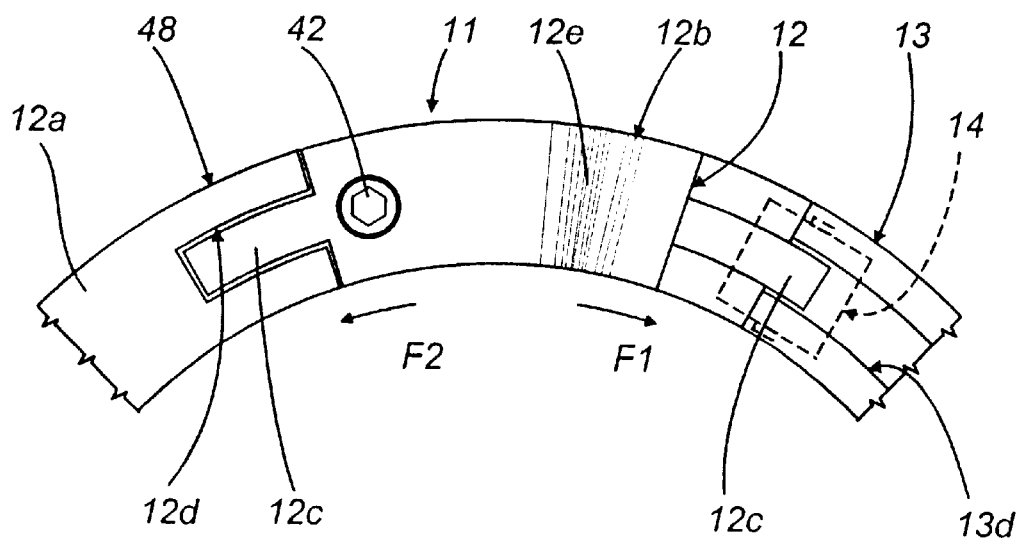
FIG. 7 shows the same detail as in FIG. 6, viewed in plan and with certain parts omitted for clarity.

In the example of FIGS. 6 and 7, the cam profile 12 comprises a fixed intermediate annular sector 12a rigidly associated with the annular track 13, and two movable annular sectors 12b each coinciding with one of the two free ends of the intermediate sector 12a. The two movable sectors 12b exhibit a contour 12e merging with the exposed portion 13a of the track 13 and are disposed and embodied in such a way as to allow of being displaced angularly about the axis 7 of rotation, along the track 13, one in relation to another and both relative to the fixed intermediate sector 12a. More exactly, each sector 12b can be displaced in relation to the end of the intermediate sector 12a with which it is associated, distanced in the direction denoted F1 or brought nearer in the direction denoted F2.

As indicated in FIG. 7, each end of each movable sector 12b presents an arcuate tongue 12c located slidably in a matching seat 13d and 12d afforded respectively by the annular track 13 and by the fixed intermediate sector 12a. Besides allowing a positional adjustment of the two sectors 12b in relation to the intermediate sector 12a, the two arcuate tongues 12c serve the ensure the continuity of the cam profile 12 offered to the roller 14. Once the desired position has been selected, the sectors 12b are secured by tightening a socket screw 42 which engages the track 13. Accordingly, as discernible from FIG. 6, the movable sectors 12b can be adjusted to extend or shorten the length of the exposed portion 13a of the track 13 offered to the roller 14.

In addition to the first lever 24, the linkage 15 comprises a second lever 16 connected mechanically to the first and to the uplifter 21. The second lever 16 is anchored pivotably by a first end to a wall of the transfer head 6 and by a second end, remote from the first end, to the second tubular shaft 22. The first lever 24 is mounted pivotably at an intermediate point to an element 17 rigidly associated with the head 6, and articulated by way of a first joint 20, at the end opposite from that which carries the roller 14, to the top end of a rod 23.

The rod 23 is slidable internally of the first tubular shaft 38 and articulated at the bottom end by way of a second joint 25 to the second lever 16.

18 denotes a spring interposed between the first lever 24 and the rigid element 17 and serving thus to force the roller 14 permanently against the cam profile 12 and against the exposed portion 13a of the track 13.

With the head 6 in rotation, the function of the actuating means 11 and 15 is to pilot the movement of the uplifter 21 cyclically along a direction substantially parallel to the axis 7 of rotation, describing a movement dictated by the geometry of the cam profile 12 and the track 13 and by the type of adjustment selected for the movable sectors 12b.

The operation of the device will now be described with reference to FIGS. 1, 3 and 4, departing from a situation in which an advancing product 2 reaches the exit end 4u of the infeed conveyor 4 with a handler unit 9 approaching the relative vertex 30 of the looped trajectory 10. As the head 6 rotates in the direction denoted F, the platform 6a causes each set of planet wheels 28 to rotate about the sun wheel 27 with the result that the second planet wheel 28b, driven by the first planet wheel 28a, causes the sleeve 44 to rotate about the axis 45. This in turn causes the hollow element 46 to rotate about the same axis 45, and with it, the second tubular shaft 22. During this angular movement of the sleeve 44 and the hollow element 46, the first tubular shaft 38 remains stationary and therefore the second tubular shaft 22 is rotated about its axis 22a by the belt 39, causing the uplifter 21 in turn to rotate about the same axis 22a in relation to the hollow element 46. The combined effect of these various movements is that the handler units 9 and therefore the uplifters 21 are caused to orbit about the rotational axis 7 of the head, following the looped trajectory 10.

As the uplifter 21 approaches and begins to pass around the first vertex 30, it will occupy a given position in space relative to the trajectory 10, determined by the timing of the rotation described above. Observing FIG. 2, in which 30 and 33 are used for convenience to denote the points, corresponding to the two vertices 30 and 33 indicated in FIG. 1, at which the handler units 9 reach their minimum velocity along the trajectory 10, the uplifter 21 passes around the first vertex 30 and joins the branch denoted 10a at a velocity denoted V1*, the minimum obtainable. As soon as the uplifter 21 has passed around the vertex 30 it begins to overhaul the advancing product 2, accelerating gradually and within the neighbourhood of the vertex 30 to a given velocity V2* greater than V1*, which also corresponds to a relative velocity of zero between the uplifter 21 advancing along the branch 10a and the product 2 advancing on the infeed conveyor 4 beneath.

Figure 2:
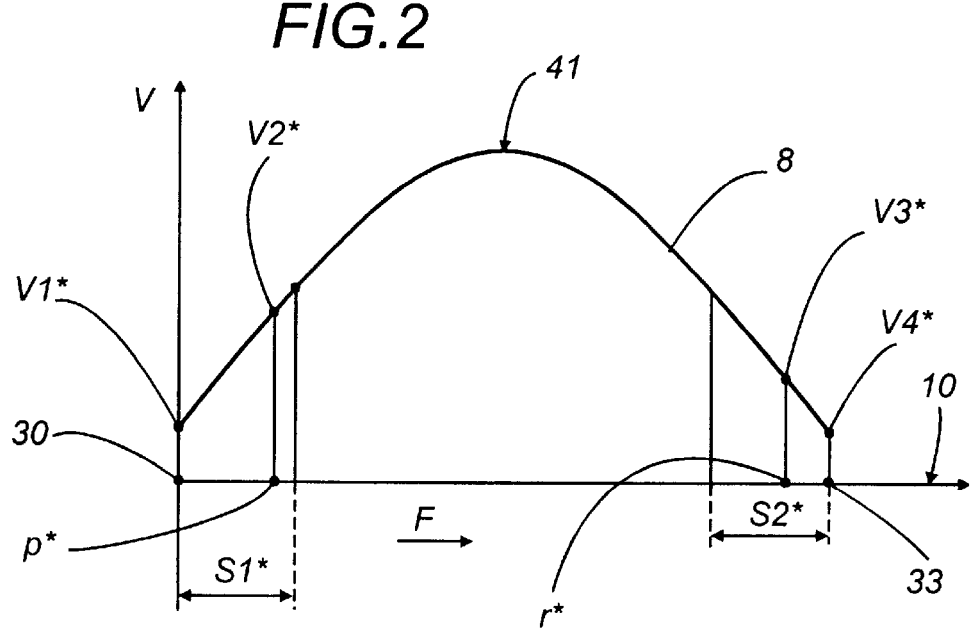
FIG. 2 is a graph in which the curve indicates the velocities of a handler unit forming part of the device in FIG. 1.

Once the velocity V2* in question is reached, the actuating means 11 and 15 cause the relative uplifter 21 to descend on the product 2 at a pickup point denoted p* in FIGS. 1, 2, and 3. In effect, the roller 14 will at this point have substantially overtaken the contour 12e of the movable sector 12b (the area denoted A in FIG. 6) and, forced up by the first lever 24 though the agency of the spring 18, passes from the previous position of following the cam profile 12 (where the roller 14 indicated by the phantom line in FIG. 6) and begins to engage the exposed portion 13a of the track 13 (see FIGS. 3, 5A and 6). At the same time, the uplifter 21 will be repositioned in space by the orienting means 19 relative to the trajectory 10 in such a way that it assumes the correct attitude for the purposes of picking up the relative product 2. As the head 6 rotates, in effect, the arm 31 is drawn in rotation about the axis 7 by the planet wheels 28 and the roller 35 moves along the relative cam profile 36; when the roller 35 engages the lobate portions 36' of the profile, the uplifter 21 will be advancing along the branches of the trajectory 10 near to the vertices 30 and 33, with the result that the arm 31 oscillates about the relative axis 45 and the first tubular shaft 38 is caused likewise to oscillate about the same axis 45. The profile of the lobate portions 36' and their distance from the axis 7 of rotation are calculated so that an angular movement of the first tubular shaft 38 transmitted through the belt 39 will occasion a corresponding movement of the second tubular shaft 22 about its axis 22a which, when compounded with the angular movement transmitted to the selfsame second shaft 22 by the planetary train and the hollow element 46, will cause the uplifter 21 to assume the appropriate position in space relative to the product 2 during the delicate pickup step and, in similar fashion, allow of positioning the products 2 in space as appropriate when released subsequently onto the outfeed conveyor 5.

Passing beyond the pickup point p*, the uplifter 21 continues to rotate gradually about the axis 22a of the shaft 22 as indicated in FIG. 1.

During the descent of the uplifter 21 toward the infeed conveyor 4, the relative suction cups will be connected to a source of negative pressure by suitable switching means (which are conventional in embodiment and therefore not illustrated) in such a way that the product 2 is taken up immediately.

The operating configuration in which the product 2 is taken up and supported by the handler unit 9 will last for as long as the roller 14 continues to engage the exposed portion 13a of the track 13, and therefore the full distance interconnecting the two movable sectors 12b of the cam profile 12.

In like manner the uplifter 21 continues rotating about the axis 22a throughout the entire duration of the transfer step that takes the product 2 from one point to another, which occurs at high speed as reflected by the central part 41 of the curve 8 in FIG. 2, and terminates on completing the prescribed angle of rotation (90° for example, as indicated in FIG. 1), at which point the uplifter 21 will be over the entry end 5i of the outfeed conveyor 25, and the roller 35 of the orienting means 19 in movement along one of the two lobate portions 36' of the cam profile 36.

Entering the neighbourhood of the second vertex 33, the handler units 9 are caused to decelerate, in terms of their linear velocity along the relative branch 10a, slowing ultimately to a given value V3* at which point the relative velocity between the unit 9 and the outfeed conveyor 5 is zero, and the uplifter 21 is positioned in space by the orienting means 19 as appropriate and in the manner already described. On reaching a position that corresponds to velocity V3*, the uplifter 21 is ideally placed to release the product 2, at a point denoted r* in FIGS. 1, 2 and 6, this also being the point at which the roller 14 encounters the contour 12e of the second sector 12b (the area denoted B in FIG. 6) and duly returns from the exposed portion 13a of the track 13 back onto the cam profile 12. As a result, the first lever 24 assumes the position indicated in FIG. 5B, causing the uplifter 21 to be elevated and thus distanced from the outfeed conveyor 5, so that the product 2 can be dropped at the prescribed point of release r*.

The sequence at the point of release is similar to that at the pickup point, inasmuch as the switching means will immediately disconnect the suction cups from the vacuum as the uplifter 21 is elevated, so that the product 2 is released. Having effected the release, the handler unit 9 continues to advance along the trajectory 10 and will pass gradually around the second vertex 33. V4* denotes the point at which the uplifter 21 is at minimum velocity in the neighbourhood of the second vertex 33.

The cycle described thus far is repeated in the same manner for each successive product 2 and for each of the orbiting handler units 9.

Importantly, observing FIGS. 2 and 6, the device according to the invention affords the facility of adjusting the two movable sectors 12b of the cam profile 12 and, for a given angular velocity of the transmission means 40, of advancing or retarding the points p* and r* at which the products 2 are picked up and released, respectively, within the intervals S1* and S2* on the trajectory 10, or more exactly on the branch denoted 10a, corresponding to the neighbourhoods of the two vertices 30 and 33.

The adjustment can be made to the position of the pickup point p* only, of the release point r* only, or of both points, observing FIG. 6 and the area denoted A, moreover, it will be evident that by displacing the second sector 12b in the direction of the arrow denoted F1, the timing of the pickup can be retarded as a consequence of distancing the relative point p* from the vertex 30 and increasing the value of velocity V2*; conversely, the timing of the pickup can be advanced by displacing the sector 12b in the direction of the arrow denoted F2 so as to move the relative point p* closer to the vertex 30, and lowering the value of velocity V2*. The adjustment is inversely the same for the area denoted B.

Thus, with the aforementioned facility for varying the position of the movable sectors 12b of the cam profile 12, the conveying device 1 can be set up to ensure optimum handling of the products 2 by the uplifters 21, according to the particular nature of the absorbent pad in production, and adjusted from one production run to the next in order to satisfy different operating requirements, should there be a need to lengthen or shorten the pitch P1 and P2 of the products and/or the velocities V1 and V2 of the infeed and outfeed conveyors 4 and 5 according to the particular size of pad.

The objects stated at the outset are realized in the device 1 disclosed, which affords a notable flexibility of adaptation to different operating conditions. In FIG. 2, for example, the velocity V2* at the pickup point p* will be seen to differ from the velocity V3* at which the product 2 is released by the uplifter 21; more exactly, the two points, pickup p* and release r*, are plotted at different stages of the intervals S1* and S2* corresponding to the neighbourhoods of the respective vertices 30 and 33.

An alternative version of the device 1 might be one in which the actuating means 11 are embodied differently to those of FIG. 6, comprising a stretch of the track 13 along which the roller 14 advances with the uplifter 21 in the raised position, and a short stretch of the cam profile 12 that comprises the two second sectors 12b and the intermediate sector 12a, along which the roller advances with the uplifter in the lowered position.

What is claimed:

1. A device for conveying products directed along a predetermined feed path, comprising:

an infeed conveyor on which the products advance in succession at a first pitch and at a first velocity;

an outfeed conveyor on which the products advance at a second pitch and at a second velocity;

a transfer head located in part between the infeed and outfeed conveyors, rotatable about an axis disposed orthogonally to the feed path and carrying at least one handler unit equipped with a relative uplifter by which the products are picked up;

transmission means disposed and embodied in such a way as to advance the handler unit, when the head is set in rotation, along a looped trajectory exhibiting at least a first vertex located above the infeed conveyor, a second vertex located above the outfeed conveyor, and a branch extending above the feed path between the same two vertices; and, actuating means operating mechanically one in conjunction with another, disposed and embodied in such a way that when the head is set in rotation, the uplifter can be displaced along a controlled direction substantially parallel with the axis of rotation toward and away from the feed path, and positioned thus to coincide with a point at which the products are picked up from the infeed conveyor and a point at which the products are released onto the outfeed conveyor, wherein the actuating means are also adjustably positionable in relation one to another and to the transmission means in such a way as to allow of varying the position of the pickup point and the position of the release point to suit a given angular velocity of the transmission means.

2. A device as in claim 1, wherein the position of the pickup point is variable within a portion of the branch of the looped trajectory located in the neighborhood of the first vertex, and the position of the release point is variable, independently of the position of the pickup point, within a portion of the branch of the looped trajectory located in the neighborhood of the second vertex.

3. A device as in claim 2, wherein the position of the pickup point is a function of a given feed velocity of the handler unit directed along the branch of the looped trajectory and coinciding with a relative velocity of zero between the handler unit and a product advancing along the infeed conveyor at the first velocity, whilst the position of the release point is a function of a given feed velocity of the handler unit directed along the selfsame branch of the looped trajectory and coinciding with a relative velocity of zero between the handler unit and a product advancing along the outfeed conveyor at the second velocity.

4. A device as in claim 1, wherein the uplifter is associated with actuating means that comprise a cam and rocker mechanism consisting of a cam and a first lever equipped with a roller engaging and following the cam, of which the first lever is articulated to a lever linkage connected mechanically in its turn to the uplifter in such a manner as to bring about the movements of the uplifter cyclically along a controlled direction substantially parallel to the axis of rotation, toward and away from the feed path, while the cam comprises a profile supported by an annular track and consisting of a fixed intermediate annular sector associated rigidly with the track, and two movable sectors defining and compassing an exposed portion of the track offered to the roller, which are disposed and embodied in such a manner as to allow their displacement along the track and positioned individually nearer to or farther from the fixed intermediate sector so as to lengthen or shorten the exposed portion and thus advance or retard the timing both of the pickup point and of the release point.

5. A device as in claim 1, wherein the products are caused to advance on the infeed conveyor occupying a first position in space and thereafter on the outfeed conveyor occupying a second position in space rotated through a given angle relative to the first position in space.

6. A device as in claim 1, wherein the transmission means comprise an epicyclic train with a fixed sun wheel and sets of planet wheels associated one with each of the handler units, each set composed of a first and a second planet wheel, a sleeve rigidly associated with each second planet wheel, supporting a first tubular shaft rotatable about its own axis relative to the sleeve and a hollow element rotatable about the same axis, of which one side in turn supports a second tubular shaft extending parallel to the axis of rotation of the head and to the axis of the first shaft, rotatable likewise about its own axis and carrying a respective uplifter, also a flexible element by way of which the second shaft is connected mechanically to the first shaft and caused thus to rotate during the operation of the transmission means, further comprising orienting means disposed and embodied in such a way as to invest the uplifter with angular movement at least in relation to the feed path.

7. A device as in claim 6, wherein orienting means comprise an arm of which one end is associated rigidly with the top end of the first tubular shaft and the opposite end serves to carry a roller engaging and following a fixed cam profile with three curvilinear portions including a first portion extending substantially equidistant from the axis of rotation around its full developable length, and two second lobate portions connected one to another and both with the first portion, of which the arm is disposed and embodied in such a way as to oscillate about the axis of the first tubular shaft during the movement of the roller along the lobate portions, thus causing the shaft also to oscillate about the axis and the flexible element to produce a corresponding rotation of the second tubular shaft which, combined with the rotation of the shaft brought about by the movement of the transmission means, causes the uplifter to assume a correct position in space relative to the products.

* * * * *